United States Patent [19]
Logomasini et al.

[11] 3,918,872
[45] Nov. 11, 1975

[54] APPARATUS IMPROVEMENTS IN A ROTARY BLOW MOLDING MACHINE

[75] Inventors: James C. Logomasini, Bridgeton, Mo.; Richard K. Shelby, Hinsdale, Ill.

[73] Assignee: Monsanto Company, St. Louis, Mo.

[22] Filed: Oct. 25, 1973
(Under Rule 47)

[21] Appl. No.: 409,652

Related U.S. Application Data

[63] Continuation-in-part of Ser. No. 182,074, Sept. 20, 1971, Pat. No. 3,785,761.

[52] U.S. Cl. ............... 425/308; 425/451; 425/806; 425/DIG. 212
[51] Int. Cl.² ...................................... B29D 23/03
[58] Field of Search.......... 425/DIG. 206, DIG. 212, 425/380, 381, 302 B, 305 B, 451, 308, 806, 387 B, DIG. 51

[56] References Cited
UNITED STATES PATENTS

| | | | |
|---|---|---|---|
| 2,443,826 | 6/1948 | Johnson | 425/249 X |
| 2,514,053 | 7/1950 | Gurries et al. | 74/55 X |
| 2,784,452 | 3/1957 | Ruekberg et al. | 425/451 |
| 3,310,834 | 3/1967 | Simpson et al. | 425/387 B |
| 3,635,069 | 1/1972 | Eickenhorst | 72/349 |
| 3,785,761 | 1/1974 | Logomasini et al. | 425/451 |

FOREIGN PATENTS OR APPLICATIONS

| | | | |
|---|---|---|---|
| 420,582 | 3/1967 | Switzerland | 425/326 |

Primary Examiner—Francis S. Husar
Assistant Examiner—Gus T. Hampilos
Attorney, Agent, or Firm—Michael J. Murphy

[57] ABSTRACT

Improvements in a multi-station rotary blow molding machine wherein a number of partible blow molds angularly spaced from each other about a main shaft on supports extending out from the axis of the machine are opened and closed by cam means generally surrounding a portion of the periphery of the machine. Portions of this cam means are in the form of rib sections along which roller followers associated with one section of each partible mold cammingly move at least during closing and preferably also during opening of the molds. Spring means may be included between the axis of the machine and each inner mold section to absorb any unplanned movement of the molds in a direction radial to the machine axis and to serve, in combination with the mold-opening portion of the cam means, as a means of severing the plastic between adjacent molds.

4 Claims, 4 Drawing Figures

APPARATUS IMPROVEMENTS IN A ROTARY BLOW MOLDING MACHINE

This application is a continuation-in-part of copending application Ser. No. 182,074, filed Sept. 20, 1971, now U.S. Pat. No. 3,785,761.

BACKGROUND OF THE INVENTION this invention relates to blow molding and more particularly to process improvements as well as improvements in apparatus components effecting mold opening and closing in a blow molding machine of the type wherein a plurality of blow molds are angularly spaced from each other about a central main shaft.

Blow molding systems wherein a series of molds are situated on supports extending radially of a central shaft are known in the prior art, e.g. U.S. Pat. Nos. 2,579,399 and 2,784,452. As set forth in U.S. Pat. No. 3,543,339, in the type of system wherein the mold sections move radial to a horizontal machine axis during opening and closing, it is also known that unless special structural arrangements are used, operating difficulties in the nature of mold chatter and vibration of certain other parts will occur during portions of the molding cycle.

More specifically, these operating difficulties are basically caused by unbalanced forces present in a continuously operating rotary machine wherein one or more relatively heavy mold assemblies are in the process of being closed within one segment of the periphery of the machine while other mold(s) assemblies in another segment of the machine periphery are being opened. Thus in the '452 patent, as machine r.p.m. is increased the centrifugal force tending to urge the mold station outwardly can exceed the gravitational force due to the weight of the station with the result that the opening roller can momentarily ride off its cam track during the portion of the cycle when the outer section is being moved toward the inner section, then stop or decrease its rotary speed, and then when the forces are balanced again and the roller returns to the cam surface, such rotary speed again must be built up. All this is occurring at the very critical point in the cycle where the mold closing roller must pick up the lead-in on the compression or mold-closed cam if the machine is to operate smoothly, and if such a smooth pickup does not occur, problems will result in the form of rough, erratic uncontrolled movement of the mold assembly during the mold-closing portion of the cycle.

The prior art approches, as elucidated in the previously mentioned '339 patent, have no doubt been effective in minimizing the effects of these operational dynamic forces, but they are not completely without dificiencies. For example, there is disclosed in U.S. Pat. No. 3,543,339, a closed track cam segment in the mold-closing portion of the machine periphery for the purpose of capturing a single follower on two sides to prevent it from bouncing back and forth during this critical phase of the molding cycle. There is also disclosed a pressure switch adjacent the end of this cam segment, which functions to shut the machine down should the resistance to mold-closing force exceed a certain level as the mold passes that particular point in the machine periphery.

To ensure that the follower will move within this type of closed cam configuration and not bind on its surfaces, a certain amount of clearance in the way of a tolerance between the outside diameter of the follower and the cam track must be provided. As each outer mold section begins to close (in the vicinity of a one o'clock position when looking at the machine in the direction of FIG. 1 of this application) the weight of each outer mold section is necessarily transferred from the inner surface of the box cam to the outer surface thereof, and as this load shift occurs the follower necessarily reverses rotation with this reversal again occurring in the mold-opening portion of the cycle when the load is transferred from the inner cam surface to the outer cam surface. Thus, each time a change in force occurs which causes the roller to move from one side of the track to the other, a change in direction of roller rotation occurs. Such a reversal in direction of the follower which occurs at least twice for each wheel revolution tends to be rather severe from the standpoint of wear, especially as rates increase. When excess clearance between the follower and cam surfaces occurs in this type of system, either by design or because of wear, the follower tends to bounce from one side of the track to the other depending on the magnitude of the various forces exerted thereon especially during mold closing. When this bouncing occurs, there again is an abrupt change in the direction of rotation of the follower with each bounce and this also increases follower wear.

SUMMARY OF THE INVENTION

Now, however, there has been developed an alternative way of neutralizing the effect of unbalanced forces during certain critical portions of the molding cycle in a continuously operating rotary blow molding machine which minimizes or eliminates difficulties existent in prior art techniques.

Accordingly, it is a principal object of this invention to provide method and apparatus improvements in a blow molding machine having a number of partible blow molds angularly spaced from each other about a main shaft on supports extending out from the axis of the machine.

Another object of this invention is to provide method and apparatus improvements in a machine of the aforementioned variety which will provide full control over each station at all times during separation of the mold sections and especially during the opening and closing movements of each mold.

A more specific object of this invention is to provide apparatus improvements in the cam means for controlling the opening and closing movement of each blow mold in a machine of the aforementioned type.

A still further object of this invention is to provide method and apparatus improvements in the mold-opening and closing portions of the cam means of such a machine which will substantially prolong the useful life of such components.

A further object of this invention is to provide apparatus improvements in the manner in which malfunctions or tolerance variations are accommodated in a machine of the aforementioned variety.

Another object of this invention is to provide structure in a machine of the aforementioned variety which automatically causes severance of the plastic between adjacent mold sections during the mold-opening portion of the cycle.

Other objects of this invention will in part be obvious and will in part appear hereinafter.

These and other objects are accomplished in a multistation rotary blow molding machine which includes a number of partible blow molds arranged in angularly equispaced configuration about a main shaft and cam means for moving one section of each partible mold toward and away from the other section of each mold, by providing the improvement wherein the portions of the cam means which move one section toward and away from the other comprise rib sections having tracks on opposite sides thereof and including roller followers associated with each said one mold section for camming movement in opposite directions along such tracks.

In a preferred embodiment, there is provided first cam means for moving one section of each partible mold toward and away from another section thereof and second cam means for holding the sections closed during a portion of the rotary path of travel, the first cam means comprising a cam including mold-opening and mold-closing portions, each of which has outer and inner surfaces, outer and inner followers associated with each outer mold section for cooperation with the surfaces of the mold-opening and closing cam portions, the outer follower adapted to cammingly rotate in one direction along the outer surface of the mold-opening portion of the cam during movement of one mold section away from the other mold section, and the inner follower being adapted to continuously rotate in the opposite direction along the inner surface of the mold-closing portion of the cam during movement of such one mold section toward the other, the distance between the followers defining a centerline, the angular position of such centerline changing with respect to a tangent to the mold-opening and closing portions of the cam during movement of one mold section toward and away from the other mold section, such tangent being taken at a point on the intersection of the centerline with the surfaces of the mold-opening and mold-closing portions. The mold-opening and closing cam portions preferably comprise rib sections which have a width which varies in a direction substantially perpendicular to the axis of the rotary machine in order to accommodate a fixed centerline distance between the followers.

From a method standpoint, there is provided the improvement which comprises cammingly engaging an outer track of an outwardly increasing mold-opening cam portion with a first rotatably mounted follower during mold opening such that the follower turns in one direction as it proceeds along such track and urges the outer mold section outwardly, smoothly transferring the weight of each outer mold section from the first follower to an adjacent, second, rotatably mounted follower after ejecting the article previously formed therein from the outer mold section, and then cammingly engaging an inner track of an inwardly directed mold closing cam portion with a second follower during mold closing such that this second follower rotate in an opposite direction from said one direction as it proceeds along such inner track and urges the outer mold section back inwardly toward its inner section.

Spring means may be provided for each mold, preferably between the axis of the machine and each inner mold section, to permit each partible mold to move incrementally substantially perpendicular to the axis of the machine as the followers traverse segments of the cam which control the position of the outer mold sections.

In another preferred embodiment, the spring means in combination with the outwardly increasing mold-opening cam portion and at least one follower associated with the outer mold section in rolling engagement with such outwardly increasing portion permits one section of each partible mold to move incrementally outward relative to the next adjacent mold thus severing plastic between an opening and such next adjacent still-closed mold because of the outward differential movement of one with respect to the other.

BRIEF DESCRIPTION OF THE DRAWINGS

In describing the overall invention, reference will be made to the accompanying drawing in which.

DESCRIPTION OF PREFERRED EMBODIMENTS

Figure 1:
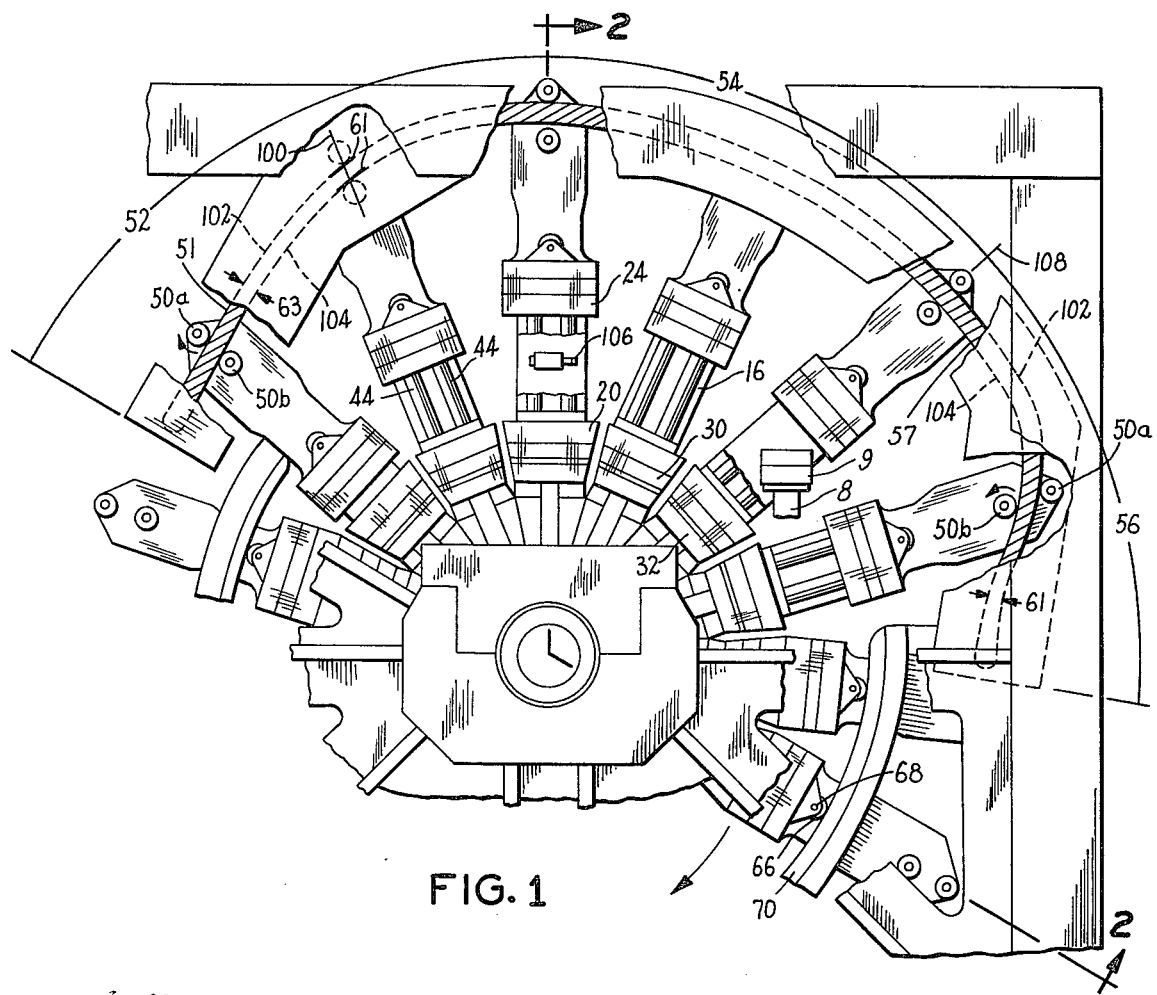
FIG. 1 is a partially schematic, fragmentary front elevational view of a blow molding machine incorporating the novel apparatus components of the present invention, with certain portions broken away and other portions in section to show details.

Referring now to the drawings, there is shown in FIG. 1, a multi-station rotary blow mold machine for forming hollow articles from portions of a continuously extruding thermoplastic parison 8 issuing from extruder head 9. Such extrusion means and thermoplastic parison are conventional in the prior art as shown in U.S. Pat. No. 2,579,399 and are shown in FIG. 1 only in outline form.

Figure 2:
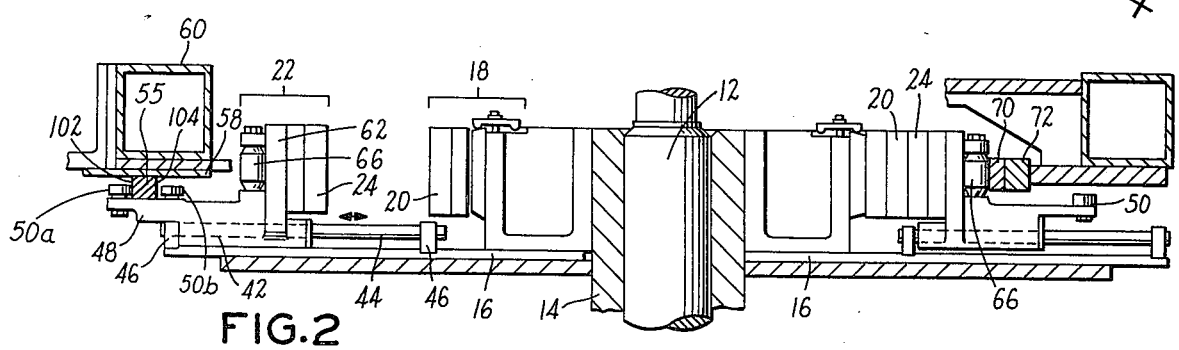
FIG. 2 is a side elevational view of the machine of FIG. 1 taken on the line 2—2 of FIG. 1, rotated 90 downwardly.

Blow mold machine 10 comprises a horizontal shaft 12 carrying a hub 14 for rotation therewith. Shaft 12 may be driven by any suitable means, such as a motor or gear reducer, or the like, not shown. A plurality of arms 16 (FIG. 2) are affixed to hub 14 and are arranged in angularly equispaced configuration about shaft 12. The number of arms 16 are determined according to space and process timing limitations.

Figure 3:
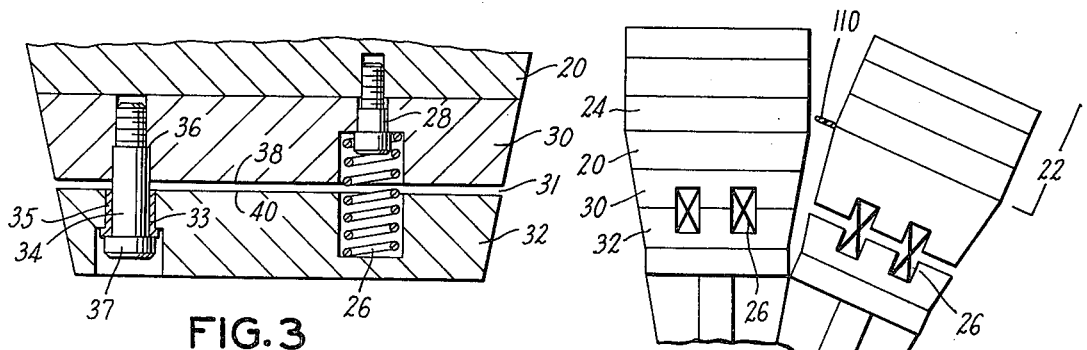
FIG. 3 is a partial, sectional view illustrating the manner of mounting each inner mold section.

Each arm 16 carries mold equipment consisting of an inner mold assembly 18 having an inner mold half or section 20 outermost thereon and an outer mold assembly 22 having an outer mold half or section 24 innermost thereon opposite inner mold half 20. Each inner mold section 20 is secured via means such as bolts 28 (FIG. 3) to inner mold carrier block 30. Spring means are provided between shaft 12 and each inner mold half 20. Such spring means permit each inner mold half 20 of each partible mold to move incrementally substantially perpendicular to horizontal shaft 12 during the mold opening and mold closing portions of the cycle, to be described hereafter in more detail. These spring means in the illustrated embodiment comprise a plurality of coil springs under compression, only one of which is shown in FIG. 3, each of which is situated within opposing cavity portions of inner mold carrier block 30 and backup plate 32, the latter being secured to inner mold carrier block 30 via a plurality of shoulder bolts 34, one of which is typically shown in FIG. 3. To assemble inner mold assembly 18, a spring is placed in the cavity portion of each backup plate 32 which in turn is secured to block 30 by advancing shoulder bolts 34 into threaded cavities formed therein until shoulder 36 bottoms out against a ledge in carrier block 30, the location of which is such that opposing surfaces 38 and 40 of carrier block 30 and backup plate 32 are separated from each other by a space 31 on the order of inch when each blow mold is in fully opened position. Resilient sliding movement of mold section 20 and carrier block 30 with respect to stationary backup plate 32 as allowed by the springs 26 is along the inner surface 33 of wear bushing 35 and the opposing surface portion of shoulder bolt 34 as limited by the abutment of the underside of the head 37 of shoulder bolt 34 against the top surface of bushing 35, this latter expanded position being illustrated in FIG. 3. Though it is preferred to employ the spring means just described with the mold opening and closing cam structure to be described hereafter, such spring means may also be used with alternative forms of cam structure for controlling the mold radial movement, e.g. in systems employing but a single mold-opening follower associated with each outer mold section.

Outer mold half 24 is mounted with other parts of outer mold assembly 22 on a slide carriage 42, arranged to move freely along arm 16 in a radial direction, to and from inner mold half 20. For this purpose, carriage 42 is slidably supported on parallel rods 44 which are anchored at their outer ends by means of brackets 46 to each arm 16. The several stacked components of the inner mold assembly 18 and outer mold assembly 22 are so located on or with reference to rods 44 that inner mold half 20 and outer mold half 24 will at all times be in proper alignment with each other.

As an important part of the present invention, first cam means are provided for moving each outer mold half 24 toward and away from each inner mold half 20 to close and open each blow mold as it traverses generally the upper half of the periphery of machine 10. First cam means includes dual roller followers comprising outer follower 50a and inner follower 50b radially spaced from each other and rotatably mounted on studs extending parallel to shaft 12, these studs in turn being supported on vertical portion 48 of carriage 42. The distance between followers 50a and 50b defines a centerline 100, the angular position of which changes with respect to a tangent, typically illustrated as 61, to the mold-opening portion 52 or mold-closing portion 56 of cam 51 to be described hereafter in more detail. Tangent 61 is taken at a point on the intersection of centerline 100 with either the outer side or track 102 of cam portion 52 or 56 or the inner side or track 104 thereof.

First cam means further comprises cam 51, shown in essential part in FIG. 1, in the form of rib 55 (FIG. 2) mounted on cam support bracket 58 (FIG. 2) which in turn is secured to machine frame 60. Cam 51 includes a mold-opening portion or segment 52, a mold dwell-portion or segment 54 and a mold-closing portion or segment 56. Each portion 52, 54 and 56 has an outer surface or track 102 and an inner surface or track 104 for cooperation with followers 50a and 50b respectively. Though the machine tolerance on the center distance between rollers 50a and 50b may be zero and still the mold assembly moving system of the invention will operate trouble-free in a manner to be described, it is preferred to allow some tolerance on such distance because of the tight space requirements for the many cooperating parts of the machine and extruder system. In any event, with zero or with a finite tolerance on such center distance the system of the invention is fully operable.

Rollers 50a and 50b may be biased, e.g. spring loaded, toward each other (or pressure actuated by any other means, i.e. hydraulic, pneumatic etc.) so as to remain in continuous contact with tracks 102 and 104, the center distance between such rollers in such case changing to accommodate a changing distance between axis 12 and mold-opening and closing portions 52 and 56. It is preferred, however, for simplicity of parts that the width of cam 51 in a direction perpendicular to the axis of machine 10 (note 61 and 63 in FIG. 1 with respect to adjacent thicknesses) be varied along portions 52 and 56 of its arcuate length to accommodate a fixed center distance between rollers 50 for such a changing radial distance between the machine axis and the cam. This varying width occurs in outwardly increasing mold-opening segment 52 and inwardly directed closing segment 56. There need be no change in such width dimension along portion 54 where the mold dwells in full open position. For purposes of manufacturing convenience and economy, portions 52, 54 and 56 are preferably fabricated as a single piece, although it is likewise within the scope of the invention to fabricate them as separate parts, which are then assembled and secured in position for the desired camming engagement with followers 50. Single piece construction of cam 51, however, eliminates the necessity of having to perfectly align a number of cam pieces, e.g. portions 52, 54 and 56, this being necessary since if alignment is off to any extent, the relatively heavy outer mold assembly 22 supported thereon will find the dip or high point at the junction of the pieces and the pounding will start which it is the very intent of the invention to avoid.

Machine 10 further preferably includes a conventional second or mold-closed cam means for holding each of sections 20 and 24 closed on each other during a portion of the rotary path of travel thereof which generally encompasses the lower half of the wheel periphery (FIG. 1). Such second cam means includes a relatively large radial cam 70 which coacts with a mold-closed follower 66 rotatably mounted on horizontal shaft 68, the latter in turn being mounted on arm portion 62 of each outer mold assembly 22. Each follower 66 is radially in-board of followers 50a and 50b and functions independently of the latter, i.e. when follower 66 is engaged with cam 70, followers 50 for the same mold station are out of engagement with cam 51 and vice versa. Cam 70, is supported by holder 72 in the manner depicted in FIG. 2, and serves to hold each mold closed while the parison portion confined therein is being expanded into the shape of a hollow article and cooled prior to the mold opening portion of the cycle, which occurs along portion 52 of cam 51.

In operation, a portion of a downwardly extruding parison 8 is positioned between an outer and an inner mold section 20 and 24 at about 1:30 – 2:00 o'clock when viewing machine 10 from the direction of FIG. 1. Each mold is revolving around a rotary path in a vertical plane and when each such mold reaches this location it is open in that sections 20 and 24 are sufficiently separated from each other as to fit a parison portion therebetween. Shortly before that, however, the mold had started to close by reason of continuous camming engagement of inner follower 50b with surface 57 of inner track 104 of inwardly directed mold-closing cam portion 56. Such coacting urges outer mold assembly 22 inwardly toward inner mold assembly 18 to close each partible mold on a parison portion and capture it between the sections. As illustrated in FIG. 1, in so doing inner follower 50b is turning in a counterclockwise direction. When a slight clearance or tolerance exists on the center distance between the axes of followers 50 with respect to the width 61 of portion 56, as is preferred, outer follower 50b will be out of contact with the surface of outer track 102 at this point in the cycle. After the mold sections are thus closed on each other by such action of follower 50b and the inward bend contour of mold-closing portion 56 of cam 51, follower 66 of the mold-closed cam means comes into and remains in camming engagement with the surface of radial mold-closed cam 70 as the closed partible mold continues in clockwise movement through approximately the lower two quandrants of the machine periphery. During this portion of the molding cycle, a hollow needle (not shown) is conventionally caused to penetrate the wall of the parison portion enclosed within the mold whereupon compressed air is injected through the needle to expand it outwardly against the wall of the mold cavity to form the article. It is desirable to maintain this pressure on the thus enclosed parison until the time for discharge from the mold in order to keep the walls thereof forced outwardly against the cooled walls of the mold cavity in order to chill and set the plastic of the thus molded article.

As the closed mold continues to rotate in a clockwise direction, it shortly reaches the end of mold closed cam 70, at which point followers 50a and 50b are on opposite sides of the initial increment of mold-opening cam portion 52. When the previously described spring means is used, springs 26 at this point are urging the inner mold section 20 and its associated carrier block 30 outward and consequently during the initial part of the mold-opening cycle, camming rolling contact occurs between inner roller 50b and the surface of inner track 104 of mold-opening portion 52, with roller 50b, still, however, turning in the same counterclockwise direction as it had previously assumed along portion 56, i.e. without any reversal in direction. After the underside of a head 37 of shoulder bolt 34 abuts against the top surface of bushing 35 to stop the spring-urged radial outward movement of the parts, outer roller 50a assumes control of the movement of each assembly 22 and cammingly engages the surface of outer track 104 of outwardly increasing mold-opening cam portion 52 to correspondingly urge outer mold assembly 22 outwardly to open the mold. During this portion of the cycle, outer roller 50a is turning in the opposite clockwise direction from that of 50b, with inner roller 50b usually being slightly spaced from track 104 because of tolerance considerations and not turning at all at this point. However, with zero tolerance between the rollers and rib width dimension, it can be appreciated that opening movement will continue to occur without any binding whatsoever in that roller 50a is smoothly turning in one direction in contact with track 102 and roller 50b is doing the same in the opposite direction in contact with track 104.

During this opening portion of the cycle, each formed article is retained in outer mold section 24 by conventional means such as an undercut in the mold surface and then is ejected from the blow molding machine as at 106 either manually or by automated means at about a 12 o'clock mold position. Each mold then passes through a circularly configured arc defined by dwell portion 54 in which area the mold sections are separated and outer follower 50a continues to bear the load of assembly 22. However, should centrifugal force because of a high speed of rotation of the wheel exceed the gravity force on assembly 22, inner follower 50b turning in the same counterclockwise direction as always will come smoothly into rolling contact with track 104 to control the radial movement and resist such centrifugal force.

As mentioned, during traversal of dwell portion 54 of cam 51 and after ejection of the molded article, the weight of the outer mold assembly is borne by outer follower 50a which continues to rotate in a clockwise direction. At the start of traversal of the mold closing portion 56, or in the vicinity of 108 in FIG. 1, the weight of the outer assembly is smoothly transferred from outer follower 50a to inner follower 50b which, if it has not already been rotating, then commences to turn in the same counterclockwise direction as previously and to urge the mold toward closed position because of the configuration of track 104 in this area, to capture another parison portion for the next cycle. Thus, there is no conflict of directional rotation of any cam follower, and control of the radial position of the outer assembly when separated from the inner assembly is maintained between rollers 50 and cam 51 at all times. Any vibration or chatter of the parts which tends to occur during load reversal, especially in the vicinity of 108 in FIG. 1 and thereafter, is avoided because of the smooth transfer of load from the outer to the inner mold follower.

With respect to spring means 26, as each blow mold is closed on passing through mold-closing portion 56 of cam 51, and each follower 66 begins to cammingly engage the surface of mold-closed cam portion 70, each spring 26 is compressed a finite amount depending on the relationship between the underside of bolt head 37 and the upper surface of bushing 35 (FIG. 3), e.g. on the order of inch, and as each blow mold is opened during traversal of mold opening portion 52 of cam 51, inner mold carrier block 30 and mold section 20 will move away from backup plate 32 an equivalent amount. Should a malfunction occur to the extent that a molded article is not properly discharged from a mold and that mold is subsequently closed on another parison portion, the just described resilient movement between faces 38 and 40 of carrier block 30 and backup plate 32 will not be as great because of the double thickness of plastic between the mold faces, or in other words spring means 26 will absorb the additional resistance to mold closing by the amount by which the mold sections are separated and thus avoid mechanical failure of the weakest portion of the stacked parts. In addition, should there be any tolerance variations in the various cam segments beyond acceptable limits, especially in the relatively large mold closed cam portion 70, spring means 26 would likewise function to absorb the additional unplanned movement of each blow mold portion as it traverses such a possibly wide tolerance portion of the cam.

Figure 4:
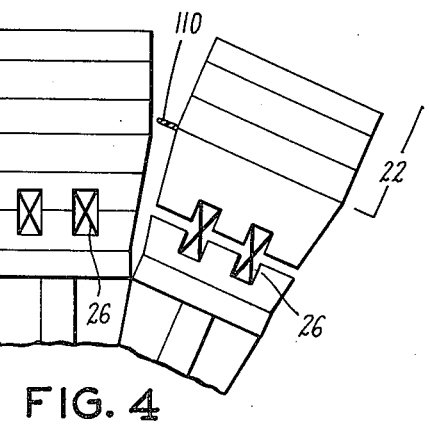
FIG. 4 is an enlarged, partial, schematic view of a portion of the machine of FIG. 1, during a particular point in the molding cycle.

Also, and as schematically depicted in FIG. 4, during the initial portion of the mold-opening part of the cycle, outer mold assembly 22 because of the radially outwardly increasing shape of cam portion 52, is moving outwardly compared with the position of the subsequent mold assembly, or in other words the subsequent mold assembly will be in the position of the first mold on the left side in FIG. 1, while the prior mold assembly will just be starting to separate along the parting line of the blow mold. The coil springs 26 of the first inner mold assembly 18, accordingly, will have expanded in comparison with the compressed condition of the springs of the next subsequent closed mold assembly. This incremental differential movement to the extent of the amount of deflection possible with spring means 26 of one section of each mold substantially perpendicular to axis 12 while the next adjacent mold is still closed serves to separate or break the plastic between adjacent blow molds as at 110 in FIG. 4. Such outward differential movement causes separation of the otherwise continuous string of formed articles (not shown) attached together by intermediate flash or waste portions.

As each inner mold assembly 18 moves incrementally outwardly under the influence of spring means 26 at the start of the mold opening portion of the cycle, the weight of outer mold assembly 22 is being borne by inner followr 50b, but then is subsequently transferred to outer follower 50a as the mold continues to open subsequent to the maximum resilient movement allowed by spring means 26. Even though such an abrupt change in loading occurs in this manner on each occasion of a mold opening, followers 50a and 50b will nevertheless always continue to turn in the same direction as they turn in other portions of the mold opening, dwell and close sections of cam 51. Since there is no reversal in direction of rotation of either follower, skidding and follower wear is accordingly substantially eliminated. Such dual follower action which avoids reversing the load the outer mold section on any single cam follower theoretically doubles the life of the followers. Also, since load reversal does not occur, wear points on tracks 102 and 104 accordingly are avoided.

Various modifications and alterations will be readily suggested to persons skilled in the art. It is intended, therefore, that the foregoing be considered as exemplary only and that the scope of the invention be ascertained from the following claims.

What is claimed is:

1. A rotary blow molding machine comprising a wheel having a plurality of arms, each arm carrying a partible mold which includes an inner and an outer mold section, said outer mold section being radially movable along said arm for closing said mold on a portion of a continuous tubular parison fed to said machine and for opening said mold to release an article formed therein, first cam means including a cam having an outwardly increasing mold-opening portion and a mold-closing portion and including followers carried with each outer mold section for periodic rolling engagement with said cam, second cam means for holding said mold sections closed during a portion of a rotary path of travel thereof, and spring means between the axis of said wheel and each inner mold section to permit one section of each partible mold to move incrementally substantially perpendicular to the axis of said wheel as said followers traverse segments of the mold-opening and mold-closing portions of said cam, whereby plastic is severed between an opening mold and a next adjacent still-closed mold because of outward differential movement of the inner mold section of the opening mold with respect to said next adjacent mold still held closed by the second cam means.

2. The machine of claim 1 wherein (a.) the mold-opening and mold-closing portions of said cam comprise rib sections having a width which varies in a direction substantially perpendicular to the axis of the rotary machine and (b.) each outer mold section includes two followers cooperating with said rib sections.

3. In a multi-station rotary blow molding machine which includes a number of partible blow molds arranged in angularly equispaced configuration about a main shaft, first cam means for moving one section of each partible mold toward and away from another section of each mold and second cam means for holding said mold sections closed during a portion of a rotary path of travel thereof, the improvement wherein said first cam means comprises a cam including mold-opening and mold-closing portions, each of said mold-opening and mold-closing portions having outer and inner surfaces, outer and inner followers associated with each outer mold section for cooperation with said mold-opening and mold-closing portions, said outer follower adapted to cammingly rotate in one direction along the outer surface of the mold-opening portion of said cam during movement of said one mold section away from the other mold section, and said inner follower adapted to continuously rotate in the opposite direction along the inner surface of the mold-closing portion of said cam during movement of said one mold section toward the other mold section, the distance between said roller followers defining a centerline, the angular position of said centerline changing with respect to a tangent to the mold-opening and mold-closing portions of said cam during movement of said one mold section toward and away from the other mold section, said tangent taken at a point on the intersection of said centerline and said surfaces of the mold-opening and mold-closing portions.

4. The machine of claim 3 wherein (a.) the mold-opening and mold-closing portions of said cam comprise rib sections each having a width which varies in a direction substantially perpendicular to the axis of the rotary machine and (b.) said centerline is fixed.

* * * * *